United States Patent
Moriizumi et al.

(10) Patent No.: US 7,974,784 B2
(45) Date of Patent: Jul. 5, 2011

(54) COLLISION PREDICTING APPARATUS AND COLLISION PREDICTING METHOD

(75) Inventors: Kiyotaka Moriizumi, Nisshin (JP); Yasuhiko Murahashi, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 12/382,537

(22) Filed: Mar. 18, 2009

(65) Prior Publication Data
US 2009/0187290 A1    Jul. 23, 2009

Related U.S. Application Data

(63) Continuation of application No. 10/542,767, filed as application No. PCT/IB2004/000192 on Jan. 28, 2004, now abandoned.

(30) Foreign Application Priority Data

Jan. 28, 2003  (JP) ................................. 2003-019108

(51) Int. Cl.
*B60W 30/08* (2006.01)
*G08G 1/16* (2006.01)
*B60W 30/16* (2006.01)

(52) U.S. Cl. ......... 701/301; 701/300; 340/903; 340/435

(58) Field of Classification Search ............ 701/96, 701/300, 301, 93, 97, 98, 302; 340/903, 340/435, 436, 438; 180/167, 232
See application file for complete search history.

(56) References Cited

U.S. PATENT DOCUMENTS

| | | | |
|---|---|---|---|
| 3,864,678 A | | 2/1975 | Yamanaka et al. |
| 4,926,171 A | | 5/1990 | Kelley |
| 5,314,037 A | | 5/1994 | Shaw et al. |
| 5,529,138 A | | 6/1996 | Shaw et al. |
| 5,633,642 A | | 5/1997 | Hoss et al. |
| 5,818,355 A | * | 10/1998 | Shirai et al. .................. 340/903 |
| 5,949,366 A | | 9/1999 | Herrmann |
| 5,964,822 A | * | 10/1999 | Alland et al. ................. 701/301 |
| 6,014,601 A | | 1/2000 | Gustafson |
| 6,035,053 A | * | 3/2000 | Yoshioka et al. ............ 382/104 |
| 6,069,581 A | * | 5/2000 | Bell et al. ........................ 342/70 |
| 6,087,928 A | | 7/2000 | Kleinberg et al. |
| 6,230,093 B1 | * | 5/2001 | Michi et al. ..................... 701/96 |
| 6,265,991 B1 | * | 7/2001 | Nishiwaki et al. ............ 340/903 |

(Continued)

FOREIGN PATENT DOCUMENTS

DE    199 63 006 A1    6/2001
(Continued)

*Primary Examiner* — Thomas G Black
*Assistant Examiner* — Christine Behncke
(74) *Attorney, Agent, or Firm* — Oliff & Berridge, PLC

(57) ABSTRACT

A collision predicting apparatus detects subject targets present in the traveling course of the own vehicle by using the relative distance and the relative velocity, etc. The apparatus also calculates the predicted collision time of each subject target on the basis of the relative distance and the relative velocity. The apparatus also detects the relative lateral position of each subject target, and corrects the relative lateral position. The apparatus then executes a collision-predicted target selecting routine, in which the predicted collision time of each subject target that does not meet a predetermined condition is set at a predetermined maximum value. The apparatus selects a subject target that meets the predetermined condition as a collision subject target, and predicts whether the collision subject target will collide with the own vehicle.

22 Claims, 4 Drawing Sheets

U.S. PATENT DOCUMENTS

| | | | |
|---|---|---|---|
| 6,484,087 B2 * | 11/2002 | Shirai et al. | 701/96 |
| 6,571,176 B1 * | 5/2003 | Shinmura et al. | 701/301 |
| 6,675,094 B2 | 1/2004 | Russell et al. | |
| 6,721,659 B2 | 4/2004 | Stopczynski | |
| 6,763,904 B2 * | 7/2004 | Winner et al. | 180/167 |
| 6,826,479 B2 * | 11/2004 | Miyahara | 701/301 |
| 6,859,731 B2 * | 2/2005 | Takafuji et al. | 701/301 |
| 6,906,639 B2 * | 6/2005 | Lemelson et al. | 340/903 |
| 7,734,416 B2 * | 6/2010 | Yano et al. | 701/301 |
| 2001/0039472 A1 * | 11/2001 | Isogai et al. | 701/96 |
| 2002/0107637 A1 * | 8/2002 | Okamura et al. | 701/301 |

FOREIGN PATENT DOCUMENTS

| | | |
|---|---|---|
| JP | A-07-318652 | 12/1995 |
| JP | A-08-248128 | 9/1996 |
| JP | A-08-254576 | 10/1996 |
| JP | A-10-211886 | 8/1998 |
| JP | A-2000-108721 | 4/2000 |
| JP | A-2000-132799 | 5/2000 |
| JP | A-2001-055105 | 2/2001 |
| JP | A-2001-126194 | 5/2001 |
| JP | A-2001-191815 | 7/2001 |
| JP | A-2001-322532 | 11/2001 |
| JP | A-2001-334896 | 12/2001 |
| JP | A-2002-225656 | 8/2002 |
| JP | A-2002-308031 | 10/2002 |
| KR | 2000-69850 | 11/2000 |
| WO | WO 95/14939 | 6/1995 |
| WO | WO 98/32030 A1 | 7/1998 |

* cited by examiner

US 7,974,784 B2

COLLISION PREDICTING APPARATUS AND COLLISION PREDICTING METHOD

This is a Continuation of application Ser. No. 10/542,767 filed Jul. 20, 2005, which in turn is a National Phase of Application No. PCT/IB04/00192 filed Jan. 28, 2004. The disclosure of the prior applications is hereby incorporated by reference herein in its entirety.

BACKGROUND OF THE INVENTION

1. Field of the Invention

The invention relates to a collision predicting apparatus and a collision predicting method for predicting whether an own vehicle and a collision target will collide.

2. Description of the Related Art

With regard to collision prediction systems, related-art technologies are disclosed in, for example, Japanese Patent Application Laid-Open Publication No. 8-254576. In a collision prediction system in the related-art technology, ultrasonic waves are transmitted, and a relative velocity of the own vehicle with respect to a specific obstacle (subject target) present around the own vehicle is calculated with high accuracy from the time needed to receive Doppler waves reflected from the obstacle (subject target). For the calculation of a relative velocity, this collision prediction system averages data that serve as a basis for the calculation of a relative velocity in order to select effective data. Subsequently, the system further averages selected effective data, and adopts average value data obtained through the averaging, so as to calculate a highly accurate relative velocity. On the basis of the highly accurate relative velocity, the system predicts (forecasts) collision with a specific obstacle (subject target).

The aforementioned collision prediction system makes a prediction (forecast) about collision of the own vehicle, with respect to a detected specific obstacle (subject target). Therefore, if there are a plurality of obstacles (subject targets) that have possibility of colliding with the own vehicle and such obstacles (subject targets) are instantaneously replaced by another obstacle (subject target), the system sometimes fails to make an accurate prediction about a collision. It is often the case that there are a plurality of collision targets that have a possibility of collision with the own vehicle. It is desirable to successively and accurately select, from such collision targets, collision targets having a high possibility of collision with the own vehicle, and to make an accurate prediction about the collision of the selected collision target with the own vehicle.

SUMMARY OF THE INVENTION

The invention has been accomplished in order to cope with the aforementioned problems, and provides a collision predicting apparatus that accurately selects a collision target having a high possibility of collision with an own vehicle and accurately predicts a collision of the selected collision target with the own vehicle.

An aspect of the invention provides a collision predicting apparatus. The collision predicting apparatus comprising: subject target detection means for detecting a plurality of subject targets that exist in a course of the own vehicle and that have a possibility of colliding with the own vehicle; relative quantity detection means for detecting a relative quantity between the own vehicle and each of the subject targets detected by the subject target detection means; collision time calculation means for predicting and calculating a collision time of each of the subject targets preceding a collision with the own vehicle, by using the relative quantity between the own vehicle and each of the subject targets detected by the relative quantity detection means; collision subject target selection means for selecting a collision subject target having a high possibility of colliding with the own vehicle based on at least the collision time of each of the subject targets calculated by the collision time calculation means; and collision prediction means for predicting a collision between the collision subject target selected by the collision subject target selection means and the own vehicle, by using the collision time of the collision subject target.

An aspect of the invention, the collision predicting apparatus includes: a subject target detector portion that detects a plurality of subject targets which exist in a course of the own vehicle and which have a possibility of colliding with the own vehicle; a relative quantity detector portion that detects a relative quantity between the own vehicle and each of the subject targets detected by the subject target detector portion; a collision time calculator portion that predicts and calculates a collision time of each of the subject targets preceding a collision with the own vehicle, by using the relative quantity between the own vehicle and each of the subject targets detected by the relative quantity detector portion; a collision subject target selector portion that selects a collision subject target having a high possibility of colliding with the own vehicle based on at least the collision time of each of the subject targets calculated by the collision time calculator portion; and a collision predictor portion that predicts a collision between the collision subject target selected by the collision subject target selector portion and the own vehicle, by using the collision time of the collision subject target.

In this apparatus, the collision subject target selection means may select, as a collision subject target, a subject target that has a shortest collision time among the collision times of the subject targets calculated by the collision time calculation means.

Another aspect of the invention provides a collision predicting method. The collision predicting method includes the steps of: detecting a plurality of subject targets that exist in a course of the own vehicle and that have a possibility of colliding with the own vehicle; detecting a relative quantity between the own vehicle and each of the subject targets detected; predicting and calculating a collision time of each of the subject targets preceding a collision with the own vehicle, by using the relative quantity between the own vehicle and each of the subject targets detected; selecting a collision subject target having a high possibility of colliding with the own vehicle based on at least the collision time of each of the subject targets calculated; and predicting a collision between the collision subject target selected and the own vehicle, by using the collision time of the collision subject target.

In this method, a subject target that has a shortest collision time among the collision times calculated with regard to the subject targets may be selected as a collision subject target.

According to the collision predicting apparatus and the collision predicting method described above, among a plurality of subject targets present forward of the own vehicle, subject targets having high possibility of colliding with the own vehicle can be accurately selected, and collision of the own vehicle with such a subject target can be predicted, by using relative quantities between the own vehicle and the subject targets. Therefore, the accuracy of collision prediction can be improved.

In the collision predicting apparatus, the collision subject target selection means may reset a selection of the collision subject target already selected, and may newly select a collision subject target. In the collision predicting method, a selection of the collision subject target already selected may be reset, and a collision subject target may be newly selected. Therefore, it becomes possible to reliably and accurately select a collision subject target.

In the collision predicting apparatus, the collision subject target selection means may select a collision subject target based on the collision time and predetermined information that is used by the subject target detection means to detect a subject target. In this case, it is preferable that the predetermined information be extrapolation flag information that is output if the collision subject target is temporarily not detected by the subject target detection means. Furthermore, in this case, it is preferable that the collision subject target selection means select the collision subject target if the number of times of output of the extrapolation flag information is within a predetermined range.

In the collision predicting method, a collision subject target may be selected based on the collision time and predetermined information that is used to detect a subject target. In this case, it is preferable that the predetermined information be extrapolation flag information that is output if the collision subject target is temporarily not detected. Furthermore, in this case, it is preferable that a subject target in which the number of times of output of the extrapolation flag information is within a predetermined range is selected as the collision subject target.

According to the above-described constructions, it becomes possible to reliably and further accurately select a collision subject target. For example, even if subject targets are instantaneously replaced by another subject target, a collision subject target can be precisely selected.

The collision predicting apparatus may further include collision time correction means for correcting the collision time predicted and calculated by the collision time calculation means using a predetermined relative quantity among the relative quantities detected by the relative quantity detection means. In this case, it is preferable that the collision time correction means correct the collision time by setting the collision time at a predetermined maximum value if it is determined that the predetermined relative quantity used is greater than a pre-set value. Furthermore, in this case, it is preferable that the predetermined relative quantity used by the collision time correction means be a quantity of offset of the subject target from a center line of the own vehicle which extends in a direction that coincides with a traveling direction of the own vehicle.

In the collision predicting method, the collision time predicted and calculated may be corrected by using a predetermined relative quantity among the relative quantities detected. In this case, it is preferable that the collision time be corrected by setting the collision time at a predetermined maximum value if it is determined that the predetermined relative quantity used is greater than a pre-set value. Furthermore, in this case, it is preferable that the predetermined relative quantity be a quantity of offset of the subject target from a center line of the own vehicle which extends in a direction that coincides with a traveling direction of the own vehicle.

According to the above-described constructions, since the collision time of a subject target that has low possibility of colliding with the own vehicle among the subject targets present in the traveling direction of the own vehicle is set at a maximum value, the subject target having low possibility of collision can be excluded from the selection subjects, so that the accuracy of selection can be improved.

In the collision predicting apparatus and the collision predicting method described above, it is preferable that the relative quantity detected includes at least one relative quantity selected from the group consisting of a relative distance of each subject target, a relative velocity of each subject target, and a direction of existence of each subject target from the own vehicle

BRIEF DESCRIPTION OF THE DRAWINGS

The above mentioned embodiment and other embodiments, objects, features, advantages, technical and industrial significance of this invention will be better understood by reading the following detailed description of the exemplary embodiments of the invention, when considered in connection with the accompanying drawings, in which.

DETAILED DESCRIPTION OF PREFERRED EMBODIMENTS

In the following description, the invention will be described in more detail in terms of exemplary embodiments.

Figure 1:
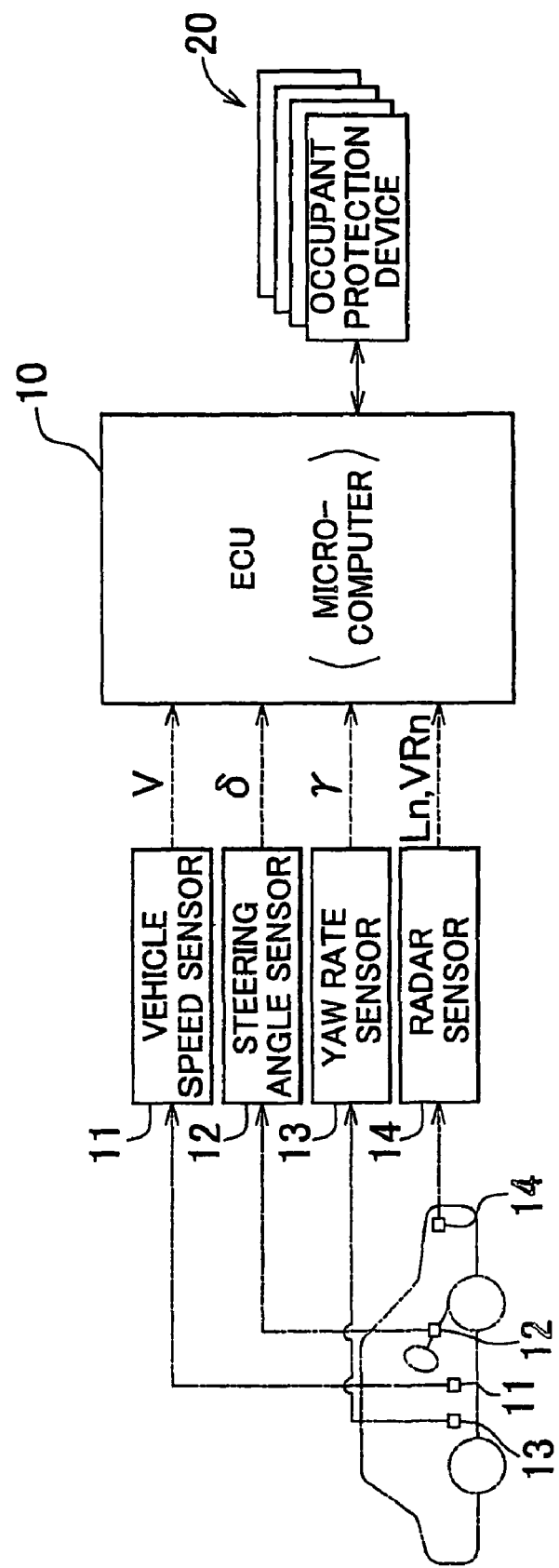
FIG. 1 is a schematic overall block diagram of a collision predicting apparatus in accordance with an embodiment and a modification of the invention.

FIG. 1 is a schematic overall block diagram of a collision predicting apparatus in accordance with an embodiment. The collision predicting apparatus actuates occupant protection devices 20 on the basis of a prediction of vehicle collision provided by an electronic control unit 10.

Figure 2:
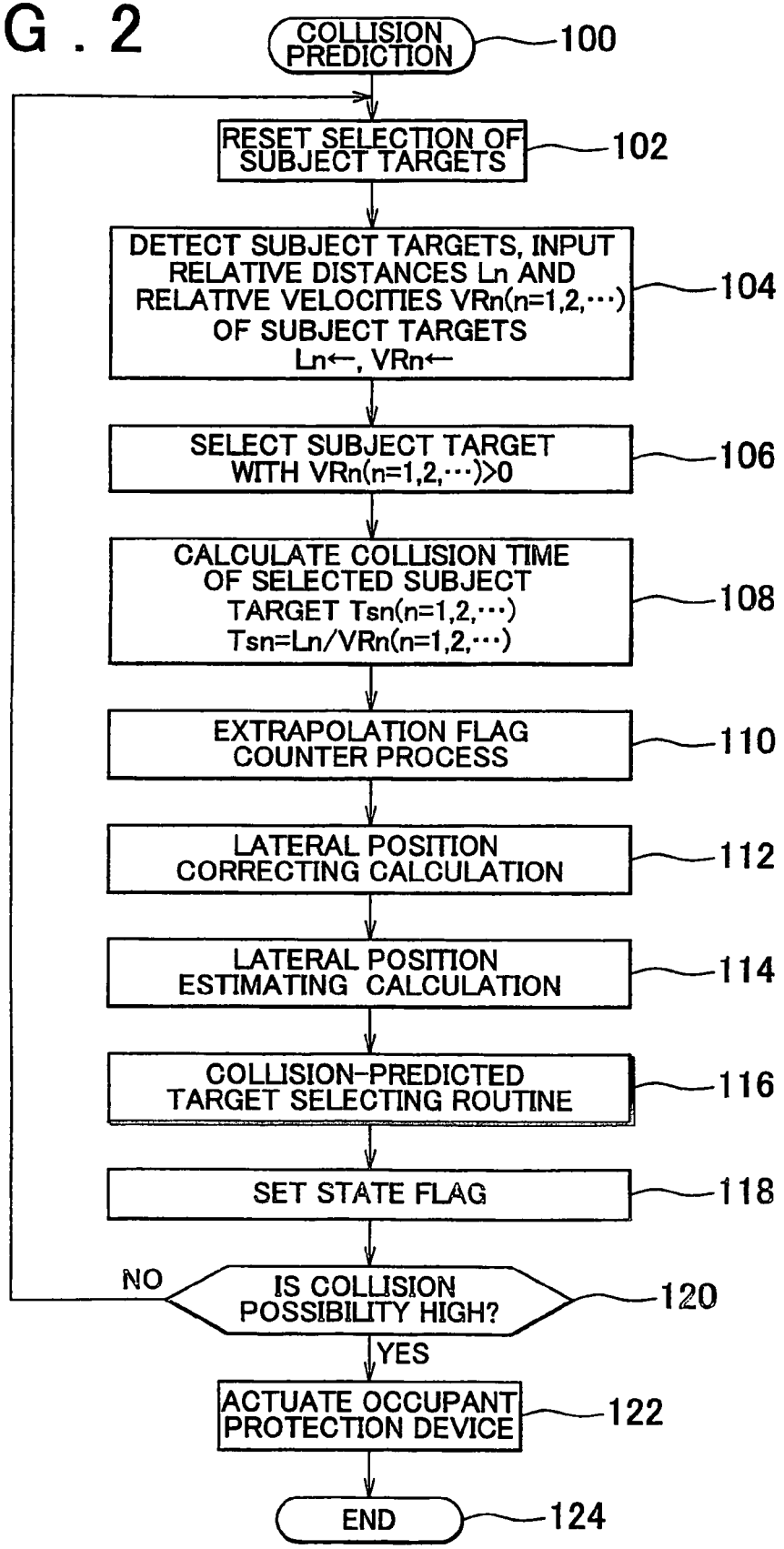
FIG. 2 is a flowchart illustrating a collision prediction program executed by an ECU (microcomputer) shown in FIG. 1 in accordance with the first embodiment of the invention.

The electronic control unit 10 (hereinafter, simply referred to as "ECU 10") has, as a main component, a microcomputer formed by a CPU, a ROM, a RAM, a timer, etc. The ECU 10 acquires detection values from various sensors and devices, and executes programs illustrated in FIGS. 2 and 3. The ECU 10 is connected to a vehicle speed sensor 11, a steering angle sensor 12, a yaw rate sensor 13, and a radar sensor 14, via communication lines (not shown) arranged in the own vehicle (e.g., LAN lines or serial lines). Since the detection values from the various sensors are output to communication lines, the detection values are available for the sensors and devices installed in the own vehicle.

The vehicle speed sensor 11 detects and outputs the vehicle speed V on the basis of a pulse signal at periods corresponding to the vehicle speed. The steering angle sensor 12 detects the front wheel steering angle $\delta$ via the ECU 10, and outputs a signal corresponding to the front wheel steering angle. The yaw rate sensor 13 detects and outputs the yaw rate $\gamma$ of the own vehicle on the basis of a signal corresponding to the rotation angular speed of the own vehicle about its center of gravity.

The radar sensor 14 is attached to a front end of the own vehicle (e.g., near a front grille). With respect to n number (n=1, 2, . . . ) of subject targets present forward of the own vehicle, the radar sensor 14 detects relative distances Ln (n=1, 2, . . . ) indicating the relative distances of the subject targets from the own vehicle, and relative velocities VRn (n=1, 2, . . .) indicating the relative velocities of the subject targets on the basis of the time required between the transmission of millimeter waves and the reception thereof. Specifically, the radar sensor 14 transmits millimeter waves forward of the own vehicle, and receives reflected waves from the n number of subject targets present forward of the vehicle. Then, the radar sensor 14 detects the relative distances Ln of the subject targets and the relative velocities VRn thereof, from the time needed between the transmission and reception of millimeter waves. Furthermore, the radar sensor 14 detects the directions of existence of the n number of subject targets present forward of the vehicle, with reference to the vehicle, and also detects direction-of-existence information indicating the directions of existence. Then, the radar sensor 14 outputs the relative distances Ln, the relative velocities VRn, and direction-of-existence information detected as described above, to the communication lines.

When outputting the relative distance Ln, the relative velocity VRn and the direction-of-existence information, the radar sensor 14 provides these detection values with information that indicates that the output detection value is a latest value (e.g., time information). This allows acquisition of latest relative distances Ln, latest relative velocities VRn and latest direction-of-existence information during execution of a collision prediction program described below.

The radar sensor 14 detects the relative distances Ln and the relative velocities VRn in every predetermined detection cycle, on the basis of the time required between transmission and reception of millimeter waves. However, since directions of reflection of millimeter waves vary depending on subject targets, there are cases where reflected waves sometimes cannot be received within a predetermined detection cycle and therefore the subject target temporarily cannot be detected (the subject target is lost track of). In such a case, the radar sensor 14 outputs, to the communication line, flag information indicating that the subject target is temporarily lost tack of (hereinafter, referred to as "extrapolation flag information"). The extrapolation flag information is output in every detection cycle of the radar sensor 14. Therefore, upon receiving the extrapolation flag information, the ECU 10 is able to grasp the fact that the subject target has temporarily been lost track of by the radar sensor 14, but exists forward of the own vehicle.

The occupant protection devices 20 are devices that control the running state of the own vehicle in order to avoid a collision on the basis of a collision prediction, a device for reducing the damage to an occupant at the time of a crash of the vehicle, etc. Examples of the occupant protection devices 20 include a device that reduces and controls the speed of the own vehicle, a device that assists the driver's depression of the brake pedal, a device that prevents forward movement of an occupant at the time of a collision, a device that appropriately adjusts the shock absorption efficiency at the time of activation of an airbag, a device that changes the impact energy absorption load, a device that moves an operating pedal, a breaker circuit that cuts off the supply of electric power to the devices other than the occupant protection devices 20 and the vehicle running state control device. These devices that constitute the occupant protection apparatus 20 are operated immediately before or after a collision of the own vehicle, and are not directly relevant to the invention. Therefore, the operations of these devices will not be described in detail, but will be described only briefly.

The device that reduces and controls the speed of the own vehicle is a device that, if the relative distance or relative velocity of a detected subject target with respect to the own vehicle goes out of a predetermined range, reduces the speed of the own vehicle by automatically operating a brake device so as to secure an appropriate relative distance or an appropriate relative velocity.

The device that assists the driver's depression of the brake pedal is a device that assists the depression of the brake pedal performed by a driver (more specifically, increases the brake fluid pressure or maintains an increased brake fluid pressure) so as to ensure reliable operation of the brake device of the own vehicle when the driver operates the brake pedal to stop the own vehicle in order to avoid a collision.

Examples of the device that prevents forward movement of an occupant at the time of a collision include a seatbelt retracting device. The seatbelt-retracting device prevents inertial forward movement of an occupant when the own vehicle collides with a subject target. Specifically, upon detection of a collision of the own vehicle, the seatbelt-retracting device retracts the seatbelt, and locks the seatbelt at the retracted position to prevent the seatbelt from being pulled out. In order to realize this function, a device for retracting and locking a seatbelt through the use of an electric motor or compressed gas has been embodied.

Examples of the device that appropriately adjusts the shock absorption efficiency at the time of activation of an airbag include a column moving device that moves a steering column in accordance with whether an occupant wears a seatbelt or with the occupant's physical constitution (body weight). The column-moving device moves the steering column so as to change the distance between the steering wheel and an occupant to a distance needed for the airbag deployment and therefore allow efficient impact absorption. In order realize this function, various devices have been embodied, including a device that changes the angle of a steering column, a device that moves a seat forward or backward, etc.

Examples of the device that changes the impact energy absorption load include an impact energy absorbing device that reduces the colliding impact of a driver on a steering wheel by absorbing energy via deformation of the steering column. The impact energy-absorbing device precisely reduces the impact energy caused by collision of a driver with the steering wheel due to the energy absorption involved in deformation of the steering column if the driver should collide with the steering wheel at the time of a collision of the vehicle. In order to realize this function, a plurality of devices have been embodied, for example, an impact energy absorbing device that incorporates a conical pin inserted into a steering column in a direction of the outer peripheral surface of the steering column, and that utilizes the deformation resistance caused when the pin inserted by a certain amount of insertion relatively moves while tearing an outer peripheral wall of the steering column.

Examples of the device that changes the impact energy absorption load include a pedal moving device that moves an operating pedal in a forward direction relative to the vehicle immediately before or at the time of a collision of the vehicle. The pedal moving device, upon detection of a collision of the vehicle, moves the operating pedal in a forward direction relative to the vehicle in order to avoid the collision between an operating pedal (e.g., the accelerator pedal, the brake pedal, etc.) and a driver's foot or leg thrown toward the pedal by inertia. In order to realize this function, a pedal moving device that moves an operating pedal via the drive force from an electric motor, a pedal moving device that moves an accelerator pedal and a brake pedal at different timings, etc., have been embodied.

The breaker circuit that cuts off the supply of electric power to the devices other than the occupant protection devices 20 and the vehicle running state control device is a breaker circuit for supplying electric power to the occupant protection devices 20 and the vehicle running state control device (e.g., ABS, a vehicle stability control device, etc.) with higher priority by cutting off the supply of electric power to the other devices. The breaker circuit cuts off the supply of electric power to the devices that are not needed for avoidance of a vehicle collision and other crashes, for example, an audio device and the like.

Operation of the collision predicting apparatus in accordance with the first embodiment constructed as described above will next be described. When an ignition switch (not shown) is turned on, the ECU 10 starts to cyclically execute a collision prediction program illustrated in FIG. 2 at every predetermined short time. The execution of the collision prediction program is started in step 100. Subsequently in step 102, the selection of subject targets having high possibility of collision (hereinafter, referred to as "collision subject target") selected during the previous execution of the program is reset.

A collision subject target is selected by execution of a collision-predicted target selecting routine in step 116 as described below. In some cases, however, the collision subject target selected by the previous execution of the collision-predicted target selecting routine comes to have a reduced possibility of collision, for example, due to a movement, with elapse of time (elapse of the program execution time). Furthermore, the collision subject target may be instantaneously replaced by another subject target due to different relative velocities of subject targets. Therefore, the collision subject target previously selected is reset, and the collision-predicted target selecting routine is executed again. Hence, it becomes possible to reliably and accurately select a collision subject target.

At the time of the initial execution of the collision prediction program, no collision subject target has been selected. However, the state where no collision subject target is selected is the same as the state where the selection of the collision subject target has been reset by execution of step 102. Therefore, the action of resetting does not become a problem or the like.

After resetting the selection in step 102, the ECU 10 executes the process of step 104 and the subsequent steps. In step 104, the ECU 10 detects a plurality of subject targets present forward of the own vehicle, and inputs the relative distance Ln and the relative velocity VRn of each detected subject target. That is, the ECU 10 acquires the relative distances Ln and the relative velocities VRn output to the communication lines by the radar sensor 14. As for the acquisition, the ECU 10 acquires the latest relative distances Ln and the latest relative velocities VRn with reference to the time information provided with the relative distance and velocity data. In this manner, the ECU 10 detects the subject targets that exist forward of the own vehicle (more specifically, detects the position of the subject targets, the number thereof, etc.), and inputs the acquired relative distances Ln and the acquired relative velocities VRn.

Subsequently in step 106, the ECU 10 selects the relative velocities VRn having positive values, among the relative velocities VRn input in step 104. This operation selects only the subject targets approaching the own vehicle, among the detected subject targets. That is, a relative velocity VRn that is not positive means that the relative distance Ln between the subject target and the own vehicle has not changed or has increased. In such a case, the subject target has no possibility of colliding with the own vehicle, and therefore there is no need for collision prediction.

After the selecting process in step 106, the ECU 10 proceeds to step 108, in which the ECU 10 calculates a collision time Tsn of each one of the subject targets selected in step 106 which is expected to elapse prior to the collision thereof with the own vehicle (hereinafter, referred to as "predicted collision time Tsn"). Specifically, the ECU 10 calculates the predicted collision time Tsn (=Ln/VRn) of each subject target selected in step 106 by dividing the relative distance Ln between the subject target and the own vehicle by the relative velocity VRn of the subject target.

Subsequently in step 110, the ECU 10 acquires the extrapolation flag information output to the communication lines by the radar sensor 14, and performs the count process thereof. The extrapolation flag counter process will be briefly described. The extrapolation flag information is output if a subject target is once detected by the radar sensor 14 in a detection cycle of the radar sensor 14, but temporarily cannot be detected in a later cycle of detection. In such a case where the radar sensor 14 cannot detect a subject target, output of the relative distance and the relative velocity thereof is impossible, so that the ECU 10 cannot acquire latest information regarding the subject target.

However, if a subject target once detected by the radar sensor 14 cannot be detected thereby in a later detection cycle, there is a high possibility that the subject target is present forward of the own vehicle. Therefore, the ECU 10 acquires the extrapolation flag information output to the communication lines by the radar sensor 14, and counts the number of times that the extrapolation flag information has been output, and temporarily stores the number of times of output of the information into a RAM (not shown). In this manner, the ECU 10 grasps the number of times that the radar sensor 14 has failed to detect the subject target. Then, the number of times that the extrapolation flag information has been output which is temporarily stored in the RAM is used for selection of a collision subject target in the collision-predicted target selecting routine of step 116 described below.

After the extrapolation flag counter process of step 110, the ECU 10 proceeds to step 112, in which the ECU 10 executes a correcting calculation of a lateral position of the subject target selected in step 106. The correcting calculation will be described below. As for the correcting calculation, there are various calculations. In the description of this embodiment, the lateral position is defined as an amount of offset Xn (1, 2, . . . ) between a center axis of the own vehicle and a side surface of each subject target (in the following description, the offset amount Xn will be referred to as "relative lateral position Xn"). The correction of the lateral position will be described with regard to a case where the lateral position is corrected through the use of the radius R of a curve along which the own vehicle is running and the relative distance Ln between the own vehicle and the subject target.

To perform the aforementioned correction of lateral position, the ECU 10 first detects the relative lateral position Xn between the center axis of the own vehicle and the side surface of each subject target. Specifically, the ECU 10 detects the relative lateral position Xn between the center axis of the own vehicle and the aforementioned recognized portion of each subject target on the basis of the relative distance Ln of each subject target and the direction-of-existence information indicating the direction in which a detected subject target exists, the distance and the information having been acquired via the communication lines.

The amount of correction of the relative lateral position Xn will next be described. The relative lateral positions Xn detected as described above are relative lateral positions Xn occurring at the moment of the present execution of the program. That is, the relative lateral positions Xn detected are relative lateral positions Xn provided on the assumption that the own vehicle travels linearly relatively to the subject targets. However, if the own vehicle is running along a curve having a radius R in order to avoid a collision with a subject target, the own vehicle does not linearly approach the subject target. Therefore, in some cases, a detected relative lateral position Xn is different from the actual relative lateral position Xn. Hence, the ECU 10 corrects the detected relative lateral position Xn through the use of the radius of curve R and the distance Ln to the subject target. The radius R of curve is estimated by the ECU 10. That is, the ECU 10 estimates the radius R of curve by acquiring a signal corresponding to the steering angle and a yaw rate γ output to the communication lines from the steering angle sensor 12 and the yaw rate sensor 13.

Next, the ECU 10 corrects the relative lateral position on the basis of the amount of correction calculated in step 112, and calculates an estimated relative lateral position. After calculating the estimated relative lateral position, the ECU 10 proceeds to step 116.

Figure 3:
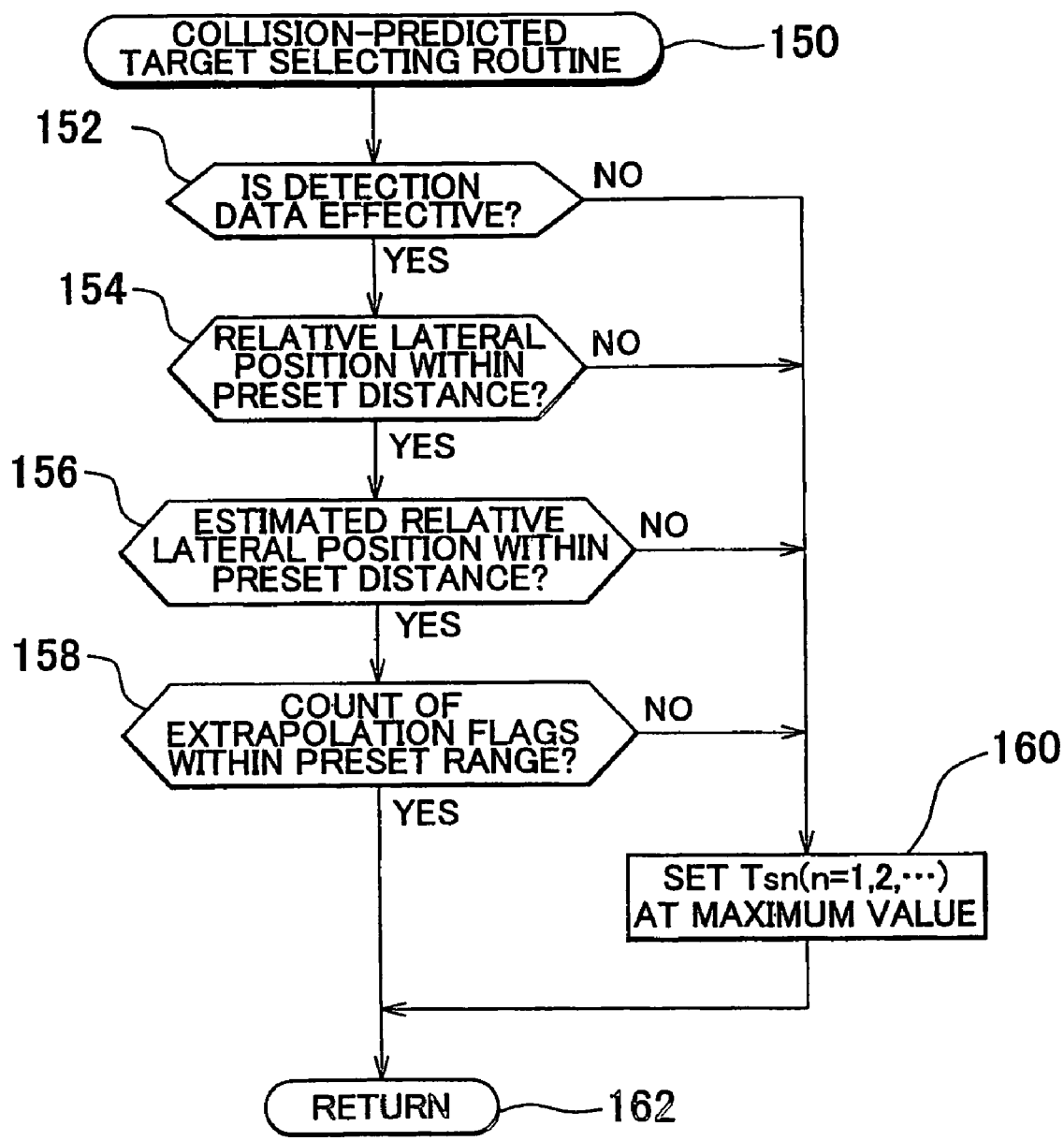
FIG. 3 is a flowchart illustrating a collision-predicted target selecting routine executed by the ECU (microcomputer) shown in FIG. 1 in accordance with the first embodiment of the invention.

In step 116, the ECU 10 executes a collision-predicted target selecting routine. The collision-predicted target selecting routine is a routine of selecting a collision subject target having high possibility of colliding with the own vehicle. This routine is started in step 150 as illustrated in FIG. 3. Subsequently in step 152, the ECU 10 determines whether each detection value acquired is effective. The ECU 10 and the sensors 11, 12, 13, 14 are interconnected via communication lines, and therefore communicate with each other. On the basis of whether the communication therebetween is reliable, it is determined whether the detection values acquired by the ECU 10 are effective. That is, if the state of communication regarding the acquired detection values is bad and the communication with the sensors 11, 12, 13, 14 is not reliable, the ECU 10 makes a determination of "NO", and proceeds to step 160.

Conversely, if the state of communication regarding the acquired detection values is good and the communication with the sensors 11, 12, 13, 14 is good, the ECU 10 makes a determination of "YES", and proceeds to step 154. In step 154, the ECU 10 determines whether the relative lateral position Xn of each subject target detected in step 112 in the main program is less than a predetermined distance ΔW. Thus, the ECU 10 determines whether, among the subject targets that actually exist forward of the own vehicle, there is any subject target that exists within a region of the predetermined distance ΔW, that is, a region of a distance that is needed for the own vehicle to run without colliding with the subject target. In this manner, the ECU 10 selects a subject target that has a great possibility of colliding with the own vehicle as the own vehicle runs.

The predetermined distance ΔW is a preset width of region (own lane) that is needed for the own vehicle to run without colliding with a subject target. In this embodiment, for example, the predetermined distance ΔW is determined as ½ of the own lane. In this case, a predetermined distance map storing a relationship between the relative velocity VR and the predetermined distance ΔW in which the predetermined distance ΔW increases as the relative velocity VR increases is provided in the ECU 10. If the relative velocity is great, the own vehicle and the subject target approach each other in a short time, so that it is necessary to increase the predetermined distance ΔW set for collision avoidance. The ECU 10 determines a predetermined distance ΔW corresponding to the relative velocity VRn of each of the selected subject targets, with reference to the predetermined distance map.

Although in this embodiment, the predetermined distance ΔW is determined as ½ of the own lane as mentioned above, the predetermined distance ΔW may also be changed in accordance with the magnitude of the curve radius R (more specifically, the absolute value |R| of the curve radius R, which applies in the following description as well). This is because the amount of correction changes depending on the magnitude of the radius of a curve along which the own vehicle runs. Therefore, if the curve radius R is large, that is, if the amount of correction is small, the predetermined distance ΔW is determined as ½ of the own lane as in the above description. Conversely, if the curve radius R is small, that is, if the amount of correction is large, the predetermined distance ΔW is determined via the multiplication by a variable that changes in accordance with the curve radius R. This manner of setting is also possible.

The determination of the predetermined distance ΔW is not limited to the above-described determination based on a preset value, such as ½ of the own lane, or the like. For example, the predetermined distance ΔW may also be determined by calculation from the relative lateral position X, the curve radius R, and the relative velocity VR.

In step 154, the ECU 10 compares the predetermined distance ΔW determined as described above with the relative lateral position Xn of each subject target. If the relative lateral position Xn of a subject target is greater than the predetermined distance ΔW, that is, if the subject target does not exist in the own lane, the ECU 10 makes a determination of "NO", and proceeds to step 160. Conversely, if the relative lateral position X is less than the predetermined distance ΔW, that is, if the subject target exists within the own lane, the ECU 10 makes a determination of "YES", and proceeds to step 156.

In step 156, the ECU 10 determines whether the estimated relative lateral position calculated in step 112 is less than the predetermined distance ΔW. Due to this step, the subject targets that have high possibility of existing in the own lane and colliding with the own vehicle despite the collision avoiding run of the own vehicle are selected from the subject targets selected as subject targets that exist in the own lane in step 154. That is, the ECU 10 compares the estimated relative lateral position with the predetermined distance ΔW. If the ECU 10 determines that the estimated relative lateral position of a subject target is greater than the predetermined distance ΔW and therefore the subject target has moved out of the own lane as a result of a collision avoiding run, the ECU 10 makes a determination of "NO", and proceeds to step 160. Conversely, if the ECU 10 determines that the estimated relative lateral position is less than the predetermined distance ΔW and therefore the subject target still exists in the own lane despite a collision avoiding run, the ECU 10 makes a determination of "YES", and proceeds to step 158.

In step 158, the ECU 10 determines whether the number of times that the extrapolation flag information has been output which is temporarily stored in the RAM is less than a predetermined number. If the number of times of output of the extrapolation flag information has reached or exceeded the predetermined number, the ECU 10 makes a determination of "NO", and proceeds to step 160. That is, if the extrapolation flag information has been output at least the predetermined number of times, it is determined that the subject target no longer exists forward of the own vehicle. Conversely, if the number of times of output of the extrapolation flag information is less than the predetermined number, the ECU 10 makes a determination of "YES", and proceeds to step 162 to return to the main program.

If the ECU 10 makes a determination of "NO" in any one of steps 152, 154, 156, 158, the ECU 10 proceeds to step 160. In step 160, the ECU 10 sets the predicted collision time Tsn of the subject target at a predetermined maximum value. As indicated above, if the determination regarding a subject target is made so that the ECU 10 proceeds to step 160, the subject target is not a collision subject target. By setting the predicted collision time Tsn of such a subject target at a maximum value in step 160, a subject target with the determination of "YES" being made in each of steps 152, 154, 156 and 158 can be selected as a collision subject target. After setting the predicted collision time Tsn of the above-described subject target at the maximum value in step 160, the ECU 10 proceeds to step 162, and returns to the main program.

Description will be made with reference to the flowchart of FIG. 2 again. After executing the collision-predicted target selecting routine, the ECU 10 proceeds to step 118. In step 118, the ECU 10 sets a state flag indicating a state where the occupant protection devices 20 are actuated, on the basis of the predicted collision time Tsn of the collision subject target selected by executing the collision-predicted target selecting routine of step 116.

More specifically, the ECU 10 is provided with a state flag setting map that stores the actuation of the occupant protection devices 20 in correspondence to the predicted collision time Tsn. For example, a state flag that indicates the actuation of a device that reduces and controls the running speed of the own vehicle, a state flag that indicates the actuation of a device that controls the running state of the vehicle, a state flag that indicates the actuation of a device that prevents forward movement of an occupant at the time of a collision, and the like are pre-set. That is, on the basis of the predicted collision time Tsn of the collision subject target, the ECU 10 selects an occupant protection device 20 to be actuated, and sets the state flag of the selected device.

After the state flag setting process in step 118, the ECU 10 proceeds to step 120. In step 120, the ECU 10 compares a predetermined time slot Tc set for prediction of a collision and the predicted collision time Tsn of the collision subject target, and therefore determines whether the collision subject target will collide with the own vehicle. It is to be noted herein that the predetermined time slot Tc is set on the basis of a minimum time needed to avoid a collision, and that the predetermined time slot Tc has various values.

More specifically, if the comparison of the predicted collision time Tsn and the predetermined time slot Tc shows that the predicted collision time Tsn is not contained in the predetermined time slot Tc, the possibility of collision of the collision subject target with the own vehicle is low. In this case, the ECU 10 makes a determination of "NO", and returns to step 102. The ECU 10 executes the process starting at step 102 repeatedly until the determination of "YES" is made in step 120. Conversely, if the predicted collision time Tsn is contained in the predetermined time slot Tc, the possibility of collision is high. In this case, the ECU 10 makes a determination of "YES" in step 120, and proceeds to step 122.

In step 122, the ECU 10 operates occupant protection devices 20 on the basis of the state flag set in step 118. That is, the ECU 10 operates the ABS or TRC to control the running state of the own vehicle so as to avoid a collision, or operates the occupant protection devices 20 so as to reduce the damage to an occupant at the time of a collision by controlling the operation of the brake pedal depression assist device, the operation of the pedal moving device, the operation of the breaker circuit, etc. After the process of step 122, the ECU 10 proceeds to step 124, and ends the execution of the collision prediction program.

According to the embodiment, it is possible to calculate the predicted collision time Tsn of each one of subject targets present forward of the own vehicle which precedes the collision of the subject target with the own vehicle, through the use of the relative distance Ln and the relative velocity VRn of each subject target with respect to the own vehicle, as described above. Furthermore, collision subject targets can be selected on the basis of predetermined information used to detect a subject target, that is, the extrapolation flag information. Then, the collision predicting apparatus is able to predict whether the own vehicle will collide with a selected collision subject target.

The collision predicting apparatus is also able to use the predicted collision time Tsn and the extrapolation flag information in selecting a collision subject target. This allows reliable and accurate selection of collision subject targets. For example, even if subject targets are instantaneously replaced by another subject target, the collision predicting apparatus is able to precisely select a collision subject target. Furthermore, since the collision predicting apparatus is able to determine whether the own vehicle will collide with a collision subject target on the basis of the predicted collision time Tsn, the calculation and operation for determination can be simplified.

Furthermore, if the relative lateral position Xn and the estimated relative lateral position of a subject target are greater than the predetermined distance ΔW, the apparatus is able to set the predicted collision time Tsn of the subject target at a maximum value. That is, if among the subject targets that exist forward of the own vehicle, each subject target having low possibility of colliding with the own vehicle is provided with a predicted collision time Tsn that is set at a maximum value, the subject targets having low possibility of collision can be excluded from the selection, and therefore the accuracy of selection can be improved.

It is to be noted herein that a subject target detection means (subject target detector portion) and a relative quantity detection means (relative quantity detector portion) in the invention are realized by the radar sensor 14 in the foregoing embodiment. A collision time calculation means (collision time calculator portion) in the invention is realized by step 108 in the foregoing embodiment. A collision subject target selection means (collision subject target selector portion) in the invention is realized by step 114 in the foregoing embodiment. A collision prediction means (collision predictor portion) in the invention is realized by step 120 in the foregoing embodiment. A collision time correction means (collision time corrector portion) in the invention is realized by step 112 in the foregoing embodiment.

In the foregoing embodiment, the subject target selected through the execution of the collision-predicted target selecting routine is selected as a collision subject target, and collision prediction is accordingly carried out. That is, in this embodiment, collision prediction is carried out even if there are a plurality of collision subject targets. Instead, it is also possible to adopt a modification in which predicted collision times Tsn of subject targets present forward of the own vehicle are calculated, and a single subject target that has the shortest predicted collision time Ts among the calculated predicted collision times Tsn is selected as a collision subject target, and collision prediction is carried out regarding the selected collision subject target.

This modification will be described in detail below. Portions of the modification comparable to those of the first embodiment are represented by comparable reference characters in the drawings, and will not be described in detail again.

Figure 4:
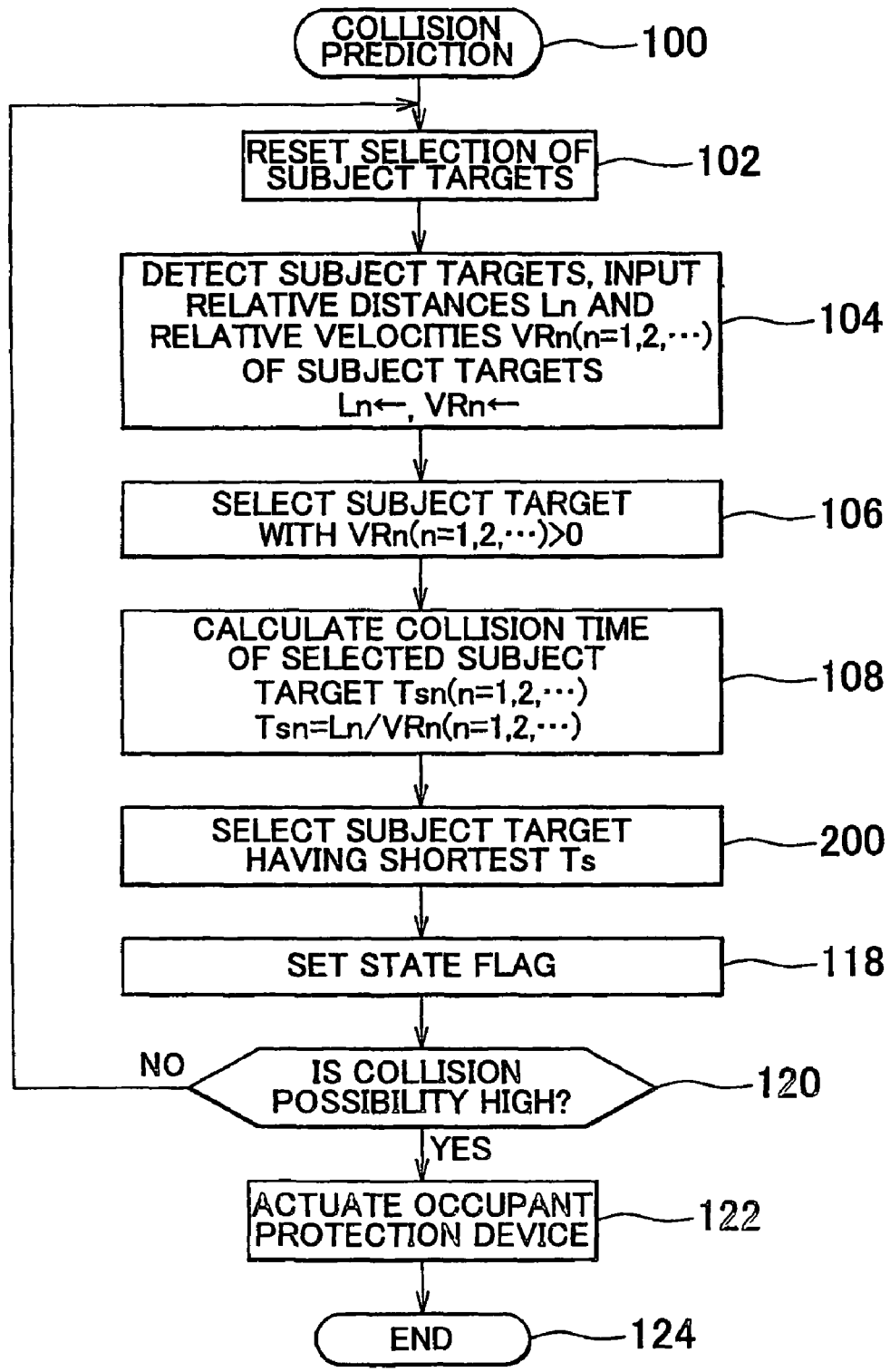
FIG. 4 is a flowchart illustrating a collision-prediction program executed by the ECU (microcomputer) shown in FIG. 1 in accordance with a modification of the invention.

In the modification, a collision prediction program illustrated by the flowchart shown in FIG. 4 is executed. The collision prediction program is modified from the collision prediction program in the first embodiment illustrated in FIG. 2 by omitting steps 110 to 116 and adding step 200.

In step 200, the ECU 10 selects a subject target that has the shortest predicted collision time Ts among the predicted collision times Tsn calculated in step 108, as a collision subject target. The subject target selected in this selecting process is a subject target that has the highest possibility of collision with the own vehicle among the detected subject targets. Therefore, the ECU 10 is able to accurately select a subject target having high possibility of collision by selecting a subject target that has the shortest predicted collision time Ts. After the selecting process of step 200, the ECU 10 executes a process similar to that in the first embodiment. That is, in step 118, a state flag is set. Subsequently in step 120, determination is conducted regarding the possibility of collision of the collision subject target selected in step 200.

According to the above-described modification, it is possible to calculate the predicted collision times Tsn of a plurality of subject targets present forward of the own vehicle, and select and determine a single collision subject target that has the shortest predicted collision time Ts among the calculated predicted collision times Tsn. Thus, a subject target that has the shortest predicted collision time Ts among the calculated predicted collision times Tsn of a plurality of subject targets, that is, a single subject target that has the highest possibility of collision, can be selected as a collision subject target. Therefore, a collision subject target can be accurately selected by simple calculation. Then, with regard to the determined collision subject target, collision with the own vehicle can be predicted. Thus, by executing a simplified collision prediction program, the collision predicting apparatus of the modification is able to accurately select a subject target having high possibility of collision with the own vehicle, and is able to increase the accuracy of the prediction of collision with the own vehicle.

In another modification, a relational expression that expresses a relationship between a predetermined relative quantity and the probability of collision is determined beforehand, and a coefficient is calculated via the relational expression, and the calculated coefficient is multiplied by a collision time. Therefore, the accuracy of collision prediction can be further improved.

While the invention has been described with reference to exemplary embodiments thereof, it is to be understood that the invention is not limited to the exemplary embodiments or constructions. To the contrary, the invention is intended to cover various modifications and equivalent arrangements. In addition, while the various elements of the exemplary embodiments are shown in various combinations and configurations, which are exemplary, other combinations and configurations, including more, less or only a single element, are also within the spirit and scope of the invention.

What is claimed is:

1. A collision predicting apparatus, comprising:
   a subject target detector portion that detects a plurality of subject targets which exist in a course of the vehicle and which have a possibility of colliding with the vehicle;
   a relative quantity detector portion that detects a relative quantity between the vehicle and each of the subject targets detected by the subject target detector portion;
   a collision time calculator portion that predicts and calculates a collision time of each of the subject targets until a collision with the vehicle, by using the relative quantity between the vehicle and each of the subject targets detected by the relative quantity detector portion;
   a collision subject target selector portion that selects a collision subject target having a high possibility of colliding with the vehicle based on at least the collision time of each of the subject targets calculated by the collision time calculator portion;
   a collision predictor portion that predicts a collision between the collision subject target selected by the collision subject target selector portion and the vehicle by using the collision time of the collision subject target;
   a relative lateral position calculation portion that calculates a relative lateral position between the center axis of the vehicle and a part of each of the subject targets, wherein the relative lateral position is calculated based on the assumption that the vehicle is moving linearly relative to the subject targets;
   a curvature estimating portion that estimates a radius of a curvature along which the vehicle is running;
   an estimate relative lateral position calculation portion that calculates an estimated relative lateral position by correcting the relative lateral position calculated by the relative lateral position calculation portion based on the radius of the curvature estimated by the curvature estimating portion; and
   wherein the collision subject target selector portion excludes the subject targets from the collision subject target if at least one of the relative lateral position and the estimated relative lateral position is greater than a predetermined distance.

2. The collision predicting apparatus according to claim 1, wherein the collision subject target selector portion selects, as the collision subject target, a subject target that has a shortest collision time among the collision times of the plurality of subject targets calculated by the collision time calculator portion.

3. The collision predicting apparatus according to claim 1, wherein the collision subject target selector portion selects the collision subject target based on the collision time, and information that indicates whether the subject target detector portion continues to detect the subject targets.

4. The collision predicting apparatus according to claim 3, wherein the information is extrapolation flag information that is output if the subject target is temporarily not detected by the subject target detector portion.

5. The collision predicting apparatus according to claim 4, wherein the collision subject target selector portion selects, as the collision subject target, a subject target in which the number of times of output of the extrapolation flag information is within a predetermined range.

6. The collision predicting apparatus according to claim 1, further comprising:
   a collision time corrector portion that corrects the collision time predicted and calculated by the collision time calculator portion using a predetermined relative quantity among the relative quantities detected by the relative quantity detector portion,
   wherein the predetermined relative quantity used by the collision time corrector portion is a quantity of offset of the subject target from a center line of the vehicle which extends in a direction that coincides with a traveling direction of the vehicle.

7. The collision predicting apparatus according to claim 1, further comprising:
   a collision time corrector portion that corrects the collision time predicted and calculated by the collision time calculator portion using a predetermined relative quantity among the relative quantities detected by the relative quantity detector portion,
wherein the collision time corrector portion corrects the collision time of each of the subject targets by setting the collision time to a predetermined maximum value.

8. The collision predicting apparatus according to claim 1, wherein the collision subject target selector portion resets a selection of the collision subject target already selected, and newly selects the collision subject target.

9. The collision predicting apparatus according to claim 1, wherein the relative quantity detected by the relative quantity detector portion includes at least one relative quantity selected from the group consisting of a relative distance of each subject target, a relative velocity of each subject target, and a direction of existence of each subject target from the own vehicle.

10. The collision predicting apparatus according to claim 1, wherein:
the relative lateral position calculation portion estimates whether the each of the target subjects exists in the course in which the vehicle is running; and
the estimate relative lateral position calculation portion estimates whether the each of the target subjects is unavoidable when the vehicle is running with the radius calculated by the curvature estimating portion.

11. A method for controlling a vehicle that includes a plurality of different occupant protection devices comprising:
detecting a plurality of subject targets that exist in a course of the vehicle and that have a possibility of colliding with the vehicle;
detecting a relative quantity between the vehicle and each of the subject targets detected;
predicting and calculating a collision time of each of the subject targets preceding a collision with the vehicle, by using the relative quantity between the vehicle and each of the subject targets detected;
selecting a collision subject target having a high possibility of colliding with the vehicle based on at least the collision time of each of the subject targets calculated;
predicting a collision between the collision subject target selected by the selecting the collision subject target step and the vehicle by using the collision time of the collision subject target;
calculating a relative lateral position between the center axis of the vehicle and a part of each of the subject targets, wherein the relative lateral position is calculated based on the assumption that the vehicle is moving linearly relative to the subject targets;
estimating a radius of a curvature along which the vehicle is running;
calculating an estimated relative lateral position by correcting the relative lateral position based on the estimated radius of the curvature; and
excluding the subject targets from the collision subject target if at least one of the relative lateral position and the estimated relative lateral position is greater than a predetermined distance.

12. The method according to claim 11, wherein a subject target that has a shortest collision time among the collision times calculated with regard to the subject targets is selected as the collision subject target.

13. The method according to claim 11, wherein the collision subject target is selected based on the collision time, and information that indicates whether the detecting the subject targets is continued.

14. The collision predicting method according to claim 13, wherein the information is extrapolation flag information that is output if the collision subject target is temporarily not detected.

15. The collision predicting method according to claim 14, wherein a subject target in which the number of times of output of the extrapolation flag information is within a predetermined range is selected as the collision subject target.

16. The method according to claim 11, wherein the predetermined relative quantity is a quantity of offset of the subject target from a center line of the vehicle which extends in a direction that coincides with a traveling direction of the vehicle.

17. The method according to claim 11, further comprising the step of:
correcting the collision time predicted and calculated by setting the collision time to a predetermined maximum value using a predetermined relative quantity among the detected relative quantities.

18. The collision predicting method according to claim 11, wherein a selection of the collision subject target already selected is reset, and the collision subject target is newly selected.

19. The collision predicting method according to claim 11, wherein the relative quantity detected includes at least one relative quantity selected from the group consisting of a relative distance of each subject target, a relative velocity of each subject target, and a direction of existence of each subject target from the own vehicle.

20. A collision predicting apparatus, comprising:
a subject target detector portion that detects a plurality of subject targets which exist in a course of the vehicle and which have a possibility of colliding with the vehicle;
a relative quantity detector portion that detects a relative quantity between the vehicle and each of the subject targets detected by the subject target detector portion;
a collision time calculator portion that predicts and calculates a collision time of each of the subject targets until a collision with the vehicle, by using the relative quantity between the vehicle and each of the subject targets detected by the relative quantity detector portion;
a collision subject target selector portion that selects a collision subject target having a high possibility of colliding with the vehicle based on at least the collision time of each of the subject targets calculated by the collision time calculator portion;
a collision predictor portion that predicts a collision between the collision subject target selected by the collision subject target selector portion and the vehicle by using the collision time of the collision subject target;
a relative lateral position calculation portion that calculates a relative lateral position between the center axis of the vehicle and each of the subject targets;
an estimate relative lateral position calculation portion that calculates an estimated relative lateral position based on a radius of a curve the vehicle is traveling along; and
a collision time corrector portion that corrects the collision time predicted and calculated by the collision time calculator portion using a predetermined relative quantity among the relative quantities detected by the relative quantity detector portion,
wherein the collision time corrector portion corrects the collision time of each of the subject targets by setting the collision time to a predetermined maximum value if at least one of the relative lateral position and the estimated relative lateral position is greater than a predetermined distance.

21. The collision predicting apparatus according to claim 20, wherein the collision subject target selector portion excludes the subject targets from the collision subject target if the collision time of the subject targets is set to the predetermined maximum value.

22. A collision predicting apparatus, comprising:
- a subject target detector portion that detects a plurality of subject targets which exist in a course of the vehicle and which have a possibility of colliding with the vehicle;
- a relative quantity detector portion that detects a relative quantity between the vehicle and each of the subject targets detected by the subject target detector portion;
- a collision time calculator portion that predicts and calculates a collision time of each of the subject targets until a collision with the vehicle, by using the relative quantity between the vehicle and each of the subject targets detected by the relative quantity detector portion;
- a collision subject target selector portion that selects a collision subject target having a high possibility of colliding with the vehicle based on at least the collision time of each of the subject targets calculated by the collision time calculator portion;
- a collision predictor portion that predicts a collision between the collision subject target selected by the collision subject target selector portion and the vehicle by using the collision time of the collision subject target;
- a relative lateral position calculation portion that calculates a relative lateral position between the center axis of the vehicle and a part of each of the subject targets, wherein the relative lateral position is calculated based on the assumption that the vehicle is moving linearly relative to the subject targets;
- a curvature estimating portion that estimates a radius of a curvature along which the vehicle is running;
- an estimate relative lateral position calculation portion that calculates an estimated relative lateral position by correcting the relative lateral position calculated by the relative lateral position calculation portion based on the radius of the curvature estimated by the curvature estimating portion; and
- wherein the collision time calculator portion compares the relative lateral position to a predetermined distance, and sets the collision time to a predetermined maximum value if the relative lateral position is greater than the predetermined distance; and
- wherein the collision time calculator portion compares the estimated relative lateral position to the predetermined distance if the relative lateral position is less than the predetermined distance, and sets the collision time to the predetermined maximum value if the estimated relative lateral position is greater than the predetermined distance.

* * * * *